(12) United States Patent
Colibert et al.

(10) Patent No.: US 7,011,327 B2
(45) Date of Patent: Mar. 14, 2006

(54) DISPLACEABLE BALL HITCH ASSEMBLY

(75) Inventors: Gregory J. Colibert, Kearns, UT (US); Floyd A. Colibert, deceased, late of West Jordan, UT (US); by Janet M. Colibert, legal representative, West Jordan, UT (US)

(73) Assignee: Colibert Enterprises, Salt Lake City, UT (US)

( * ) Notice: Subject to any disclaimer, the term of this patent is extended or adjusted under 35 U.S.C. 154(b) by 100 days.

(21) Appl. No.: 10/782,707

(22) Filed: Feb. 18, 2004

(65) Prior Publication Data

US 2004/0227325 A1    Nov. 18, 2004

Related U.S. Application Data

(60) Provisional application No. 60/448,962, filed on Feb. 19, 2003.

(51) Int. Cl.
*B60D 1/44*    (2006.01)

(52) U.S. Cl. ............... 280/479.1; 280/511; 280/901; 280/441.2

(58) Field of Classification Search ............ 280/478.1, 280/482, 479.1, 496, 491.1, 432, 901, 441, 280/417.1
See application file for complete search history.

(56) References Cited

U.S. PATENT DOCUMENTS

| | | | | |
|---|---|---|---|---|
| 2,051,522 A | | 8/1936 | Graham | |
| 3,955,831 A | | 5/1976 | Whitchurch | |
| 4,119,330 A | * | 10/1978 | Capps | 280/432 |
| 4,240,647 A | * | 12/1980 | Lewis | 280/482 |
| 4,253,680 A | * | 3/1981 | Albright et al. | 280/479.1 |
| 4,573,699 A | * | 3/1986 | Smith | 280/432 |
| 4,729,575 A | | 3/1988 | Eggen | |
| 4,807,899 A | * | 2/1989 | Belcher | 280/477 |
| 4,993,737 A | * | 2/1991 | Torcomian | 280/407 |
| 5,338,050 A | | 8/1994 | Haire et al. | |
| 5,707,070 A | | 1/1998 | Lindenman et al. | |
| 5,772,229 A | | 6/1998 | Cattau | |
| 6,152,475 A | * | 11/2000 | Poole | 280/426 |
| 6,231,065 B1 | * | 5/2001 | Brown | 280/482 |
| 6,308,977 B1 | | 10/2001 | Pulliam et al. | |
| 6,485,045 B1 | | 11/2002 | King | |
| 6,634,666 B1 | * | 10/2003 | Shilitz et al. | 280/470 |

* cited by examiner

*Primary Examiner*—Lesley D. Morris
*Assistant Examiner*—Michael T. Nguyen
(74) *Attorney, Agent, or Firm*—Thorpe, North & Western LLP

(57) ABSTRACT

A method and apparatus for providing a displaceable ball hitch assembly configured to be mounted in a bed of a truck. The displaceable ball hitch assembly includes a platform track, a displaceable platform, a gate member and a driving mechanism. The platform track defines a track space therein and is configured to be mounted in the bed of the truck. The displaceable platform is configured to be positioned in the track space and includes a ball hitch coupled thereto. The gate member is configured to be coupled to the platform track and includes a gate portion extendable into the track space. The driving mechanism is configured to be operatively coupled to the gate member and is configured to automatically displace the gate portion from the track space to facilitate displacement of the displaceable platform upon manual activation from a cab of the truck.

10 Claims, 2 Drawing Sheets

DISPLACEABLE BALL HITCH ASSEMBLY

This application claims the benefit of U.S. Provisional Patent Application No. 60/448,962, filed Feb. 19, 2003.

FIELD OF THE INVENTION

The present invention relates generally to a ball hitch assembly. More particularly, the present invention relates to a displaceable ball hitch assembly for mounting in a bed of a short-bed pick-up truck.

BACKGROUND OF THE INVENTION

A fifth-wheel trailer is generally a large, high profile trailer which is coupled to a large towing vehicle, such as a large pick-up truck. The fifth-wheel trailer is typically coupled to the truck with a fifth-wheel hitch or a ball-hitch. The fifth-wheel hitch is typically permanently mounted in the bed of the truck and is made to couple directly to the fifth wheel trailer. The fifth-wheel hitch, however, is bulky with a high profile, limiting the space in the bed of the truck and often resulting in annoyance to the truck owner when desiring to use the truck for uses other than towing the fifth-wheel trailer.

The ball-hitch also permanently mounts in the bed of the truck, but is less bulky and low in profile. The ball-hitch is typically made to attach to what has become known in the industry as a gooseneck type assembly. The gooseneck type assembly typically includes an extended, crooked neck which is configured to extend from the fifth-wheel trailer into the bed of the pick-up truck. The free end of the neck includes a ball receiving locking mechanism for rotatably coupling to the ball-hitch mounted to the bottom of the bed of the pick-up truck. One example of a gooseneck type assembly is found in U.S. Pat. No. 5,240,270 to Colibert.

One problem with towing a fifth wheel trailer is that such towing is primarily limited to long-bed pick-up trucks. The long-bed pick-up trucks are used for such towing, as opposed to short-bed trucks, due to the danger of the front of the trailer hitting the cab when making a sharp turn, such as a 90 degree turn. Further, pick-up trucks having long-beds are generally designed to carry large loads with greater suspension and towing capabilities. Due to the clearance between the front of the fifth-wheel trailer and the cab of the pick-up truck, short-bed trucks have essentially been limited to towing from the hitch at the rear-end of the truck, which excludes fifth-wheel trailers.

However, there is a large market for short-bed trucks due to their versatility, smaller turning radius and more compact nature. Further, many of the short-bed trucks include suspension and towing capabilities sufficient to handle many of the fifth-wheel trailers. It would therefore be advantageous to be able to utilize short-bed pick-up trucks for towing a fifth-wheel trailer with the clearance necessary to make sharp turns without damaging the front of the trailer and the cab of the truck.

SUMMARY OF THE INVENTION

The present invention relates to a method and apparatus for providing a displaceable ball hitch assembly configured to be mounted in a bed of a truck. The displaceable ball hitch assembly includes a platform track, a displaceable platform, a gate member, a driving mechanism and a switch control. The platform track defines a track space therein and is configured to be mounted in the bed of the truck. The displaceable platform is configured to be positioned in the track space and includes a ball hitch coupled thereto. The gate member is configured to be coupled to the platform track and includes a gate portion extendable into the track space. The driving mechanism is configured to be operatively coupled to the gate member and is configured to facilitate displacement of the displaceable platform. The switch control is configured to be operatively coupled to the driving mechanism and is configured to be located in a cab of the truck to manually control activation of the driving mechanism from the cab.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

While the specification concludes with claims particularly pointing out and distinctly claiming that which is regarded as the present invention, the advantages of this invention may be ascertained from the following description of the invention when read in conjunction with the accompanying drawings, in which:

DETAILED DESCRIPTION

Figure 1:
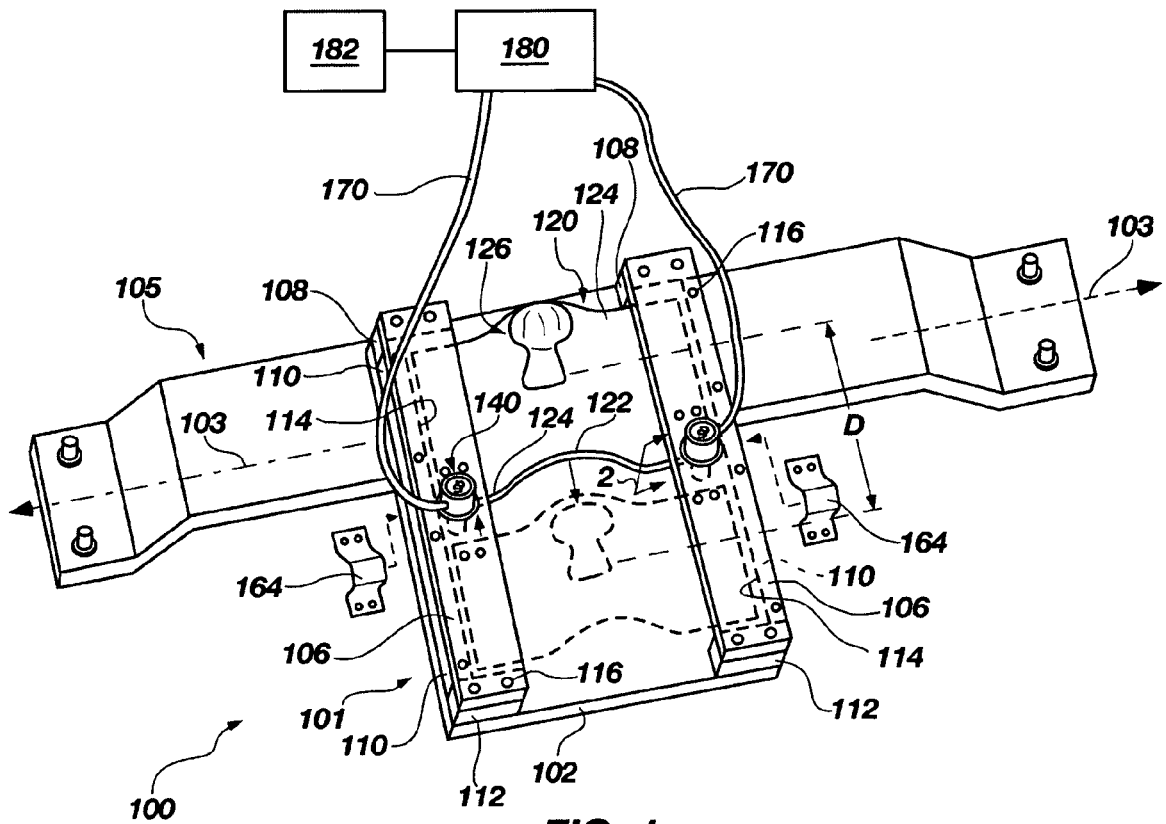
FIG. 1 illustrates a perspective view of a ball hitch assembly including a platform track and a ball hitch mounted on a platform, depicting the platform being displaceable between a first and second position in the platform track, according to an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

FIG. 1 illustrates a ball hitch assembly 100 including a platform track 101, a platform 120 having a ball hitch 126 mounted thereon, and a gate member 140. The platform track 101 is configured to define a track space 114 therein to allow movement of the platform 120 along the track space 114. Such a platform track 101 can be mounted to the bottom of a truck bed (not shown). The gate member 140 is configured to retain the platform 120 in either a first primary position (as depicted in drawing) or a second position (shown in outline). The gate member 140 can also be opened to allow movement of the platform 120 from the first primary position to the second position as well as allow movement of the platform 120 from the second position and back to the first primary position.

Such a ball hitch assembly 100 is configured to mount in the bed of a short-bed pick-up truck and configured to couple to a gooseneck type assembly extending from a fifth-wheel trailer. An example of a gooseneck type assembly configured to couple with a ball hitch is disclosed in U.S. Pat. No. 6,024,372 to Colibert et al., which disclosure is incorporated herein. According to an aspect of the present invention, the platform 120 with the ball hitch 126 extending therefrom is moveable between the first and second positions with a displacement D of approximately nine inches. The displacement D, however, can include any suitable displacement length depending on the configuration of the ball hitch assembly 100 and depending on the specifications and requirements of various fifth-wheel trailers and short-bed pick-up trucks. Placing the platform in the second position allows the clearance necessary between the front of the fifth-wheel trailer and the cab of the short-bed truck when driving the truck through a sharp turn, such as a 90 degree turn. Once such a turn is completed, the platform should be placed back into the first primary position while towing the fifth-wheel trailer where there are no sharp turns.

The ball hitch assembly is configured to be mounted in a truck bed (not shown), such as a short-bed pick-up truck. In particular, the platform track 101 is configured to be secured to a mounting frame 105 with the truck bed (not shown) disposed therebetween. The mounting frame 105 is concealed under the truck bed and secured to the chassis of the truck. The concealed mounting frame 105 is positioned to the chassis of the truck such that the ball hitch 126 is positioned approximately four inches in front of an axis 103 corresponding to the rear wheel axel of the truck, when the platform is in the first primary position. Such a concealed mounting frame is disclosed in U.S. Pat. No. 5,246,244 to Colibert, which disclosure is incorporated herein.

The platform track 101 can include a bottom plate 102, first and second upper plates 104 and 106 and front, side and back spacers 108, 110 and 112. The platform track 101 can be made with the first and second upper plates 104 and 106 disposed over a top surface of the bottom plate 102 with each of the spacers sandwiched therebetween. In particular, the front and back spacers 108 and 112 can be positioned on the top surface of the bottom plate 102 and substantially flush with the edges at each corner of the bottom plate 102. The length of the front and back spacers 108 and 112 can be substantially the same as the width of the first and second upper plates 104 and 106. The side spacers 110 also are positioned on the top surface extending length wise on first and second longitudinal sides of the bottom plate 102 and substantially flush with the first and second edges of the bottom plate 102. The width of the side spacers 110 are sized smaller than the width of the first and second upper plates 104 and 106. The first and second upper plates 104 and 106 can then be positioned over each of the spacers so that the outer edges are flush with the outer edges of each of the spacers and the bottom plate 102 and the inner edges of the first and second upper plates 104 and 106 over hang past the inner edges of the side spacers 110. Each of the bottom plate 102, spacers and first and second upper plates 104 and 106 include holes 116 extending transversely therethrough configured to receive bolts for fastening each of the bottom and upper plates and spacers together. With this arrangement, each of the spacers sandwiched between the first and second upper plates 104 and 106 and the bottom plate 102 defines a track space 114, shown in outline, within the platform track 101. The front spacers 108 and the back spacers 112 define ends of the track space 114 and the side spacers 110, having a smaller sized width than the first and second upper plates 104 and 106, define sides of the track space 114.

The platform 120 can be sized and configured to be positioned in the track space 114 of the platform track 101. The platform 120 can include a raised portion 122 and a lower portion 124 with the ball hitch 126 extending upward from the raised portion 122. The lower portion 124 can extend outward from opposing sides of the raised portion 122 to extend between the bottom plate 102 and the respective first and second upper plates 104 and 106. In this manner, the lower portion 124 is confined within the track space 114 of the platform track 101 and the raised portion 122 is exposed so that the ball hitch 126 is readily accessible for coupling to a gooseneck type assembly (not shown) extending from the fifth wheel trailer. Further, with the lower portion 124 of the platform 120 disposed within the track space 114 of the platform track, the platform is configured to slidingly move with metal-to-metal contact within the track space 114. Such track space can be lubricated with a grease type lubricant to reduce the friction of such metal-to-metal contact. Any other suitable means of sliding movement can also be employed, such as with rollers, bearings, etc., as known to one of ordinary skill in the art. The platform track 101 and platform 120 are made of a high strength metal sized and configured to handle loads for towing fifth-wheel trailers as known to one of ordinary skill in the art.

Figure 2:
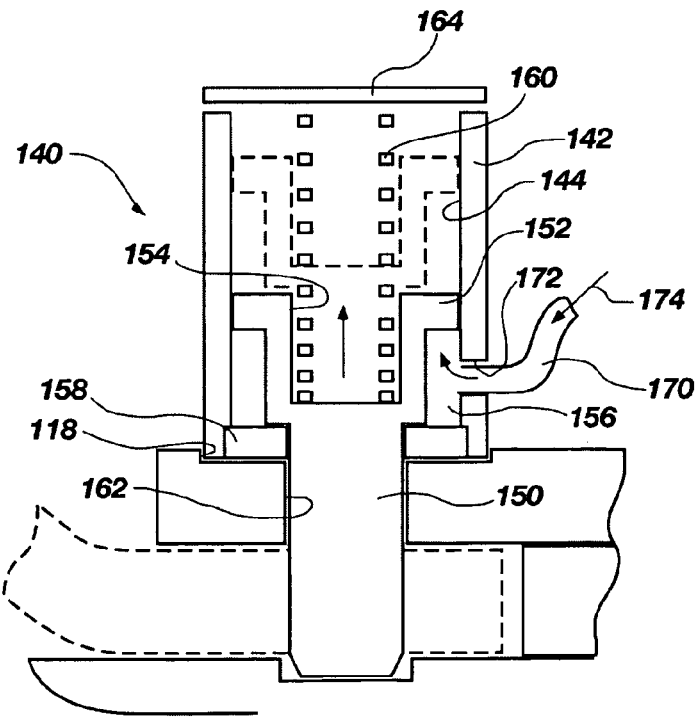
FIG. 2 illustrates a cross-sectional view of a gate member taken along line 2 in FIG. 1, depicting the gate member having a cylinder, piston and spring assembly with tubing extending into the cylinder for pressurized air flow, according to an embodiment of the present invention.

Referring now to FIGS. 1 and 2, the platform track 101 also includes a gate member 140 positioned in a plate recess 118 in each of the first and second upper plates 104 and 106. Each gate member 140 can be stabilized to the platform track 101 by a retaining piece 164. Such retaining piece can be configured to extend over the gate member 140 and bolted to the upper plate. The gate member 140 is configured to retain and allow displacement of the platform along the track space 114.

Each gate member 140 can include a cylinder 142 with a piston 150 and a spring 160 disposed in the cylinder 142. Such a cylinder 142 is positioned in the plate recess 118 with the piston 150 extending through an opening 162 in the upper plate and into the track space 114. The piston 150 can include a flange 152 and a recess 154. The flange can be configured and sized to contact an inside surface 144 of the cylinder 142. The recess 154 can be defined in the top of the piston 150 and is configured to receive and hold the spring 160 so that the spring 160 biases the piston 150 downward into the track space 114 of the platform track 101. The cylinder 142 can also include an annular seal 158 configured to be disposed at a bottom portion of the cylinder 142 with the piston 150 disposed through an opening in the center of the annular seal 158. With this arrangement, the piston 150 for each gate member 140 extends through the respective first and second upper plates 104 and 106 into the track space 114 of the platform track 101. Such gate member 140, with the piston 150 extending into the track space 114, is configured to retain the platform 120 in a first primary position, as indicated in the drawing, and in a rearward second position, as shown in outline.

The cylinder 142 also includes a hole 172 defined at a lower portion of the cylinder 142. The hole 172 is sized and configured to receive tubing 170. The tubing 170 is operatively coupled to an air supply 180, such as a compressor and air tank, to blow air through the tubing 170 into cylinder 142. The air supply 180 can be located proximate to or adjacent the ball hitch assembly 100 or any suitable location in the truck bed. The air supply 180 can be activated by a switch control 182 located in the cab of the truck. Such a switch control 182 can be operatively coupled to the air supply 180 via, for example, an electrical wire. Upon activating the air supply 180, air is forced, as indicated by arrow 174, through the tubing 170 and into a space 156 in the gate member 140. The space 156 can be defined by the outer surface of the piston 150, the flange 152 and a portion of the inner surface 144 of the cylinder 142. The air forced through the tubing 170 in the space 156 pushes the piston 150 from a closed gate position to an open gate position (as shown in outline in FIG. 2) against a biasing force of the spring 160 so that a bottom portion of the piston 150 moves out of and from the track space 114.

In practice, in the case where the driver is driving the truck through a sharp turn and is concerned that the fifth-wheel trailer may not clear the cab when making such turn, the driver can switch the air supply 180 with the switch control 182 in the cab of the truck to the on position which effects displacement of the piston 150 in each of the gate members 140 to an open gate position. The driver can then set the brakes on the trailer and move the truck forward. With the forward movement of the truck, the platform 120 displaces rearward along the track space 114 to a second position (as shown in outline in FIG. 1). The driver can then move the switch control 182 to the off position to turn-off the air supply 180, thereby, allowing the piston 150 to move back in the closed gate position to lock the platform 120 in the second position. The driver can then take the brakes off of the trailer and proceed in making the sharp turn. Once the driver completes the sharp turn, the driver can then re-set the brakes on the trailer and switch the air supply 180 on to move the piston 120 in each of the gate members 140 in the open gate position. The driver can then back the truck up to displace the platform 120 back to the first primary position. The driver then turns the air supply 180 off so that the piston 150 in each of the gate members 140 moves to the closed gate position to retain the platform 120 in the first primary position. The driver can then take the brakes off of the trailer and proceed in towing the trailer.

Figure 3:
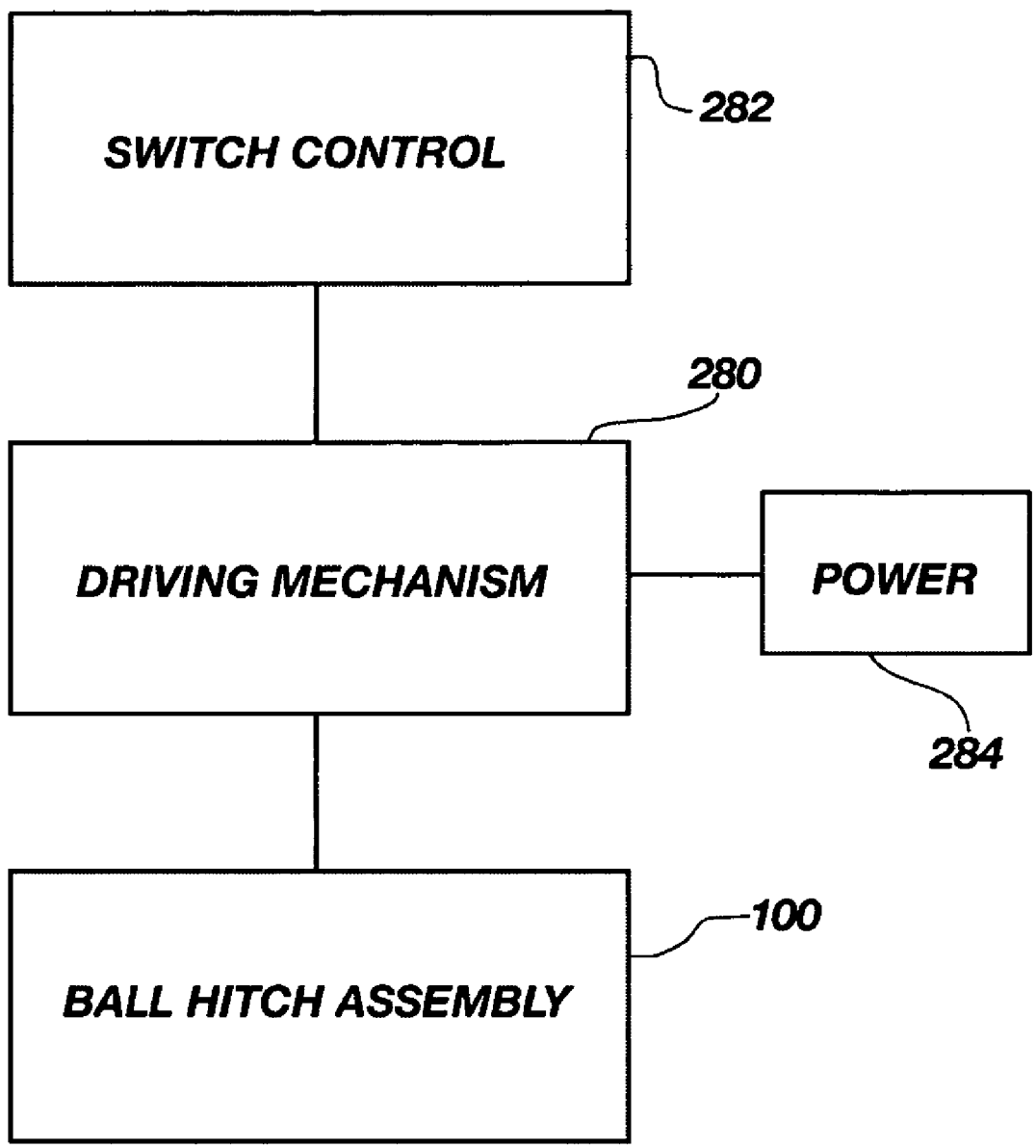
FIG. 3 illustrates a block diagram of a ball hitch assembly, according to an embodiment of the present invention.

FIG. 3 illustrates a block diagram of the ball hitch assembly 100 operatively coupled to a driving mechanism 280 and the switch control 282. In one embodiment, the driving mechanism 280 can be the air supply, as previously set forth, and the ball hitch assembly 100 can include similar components as described with respect to FIGS. 1 and 2. In another embodiment, the driving mechanism 280 can be driven hydraulically for displacing the piston in the gate member. Alternatively, the platform can be coupled to a hydraulic mechanism for directly displacing the platform in the track space of the ball hitch assembly depicted in FIG. 1. In another embodiment, the driving mechanism 280 can be driven electrically to displace the piston, such as by implementing a solenoid, electric motor, etc. In any case, the driving mechanism 280 can be operatively coupled to both the ball hitch assembly 100 and the switch control 282 in the cab of the truck for manual activation of the driving mechanism 280 from the cab of the truck. Further, the drive mechanism 280 can be wired for power 284 from, for example, the battery of the truck. As can be well appreciated, the driving mechanism 280, whether driven pneumatically, hydraulically and/or electrically, can be readily implemented by one of ordinary skill in the relevant art.

It is to be understood that the above-referenced arrangements are only illustrative of the application for the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A displaceable ball hitch assembly configured to be mounted in a bed of a truck, comprising:
    a platform track defining a track space therein and configured to be mounted in the bed of the truck;
    a displaceable platform configured to be positioned in the track space and including a ball hitch coupled thereto;
    a gate member configured to be coupled to the platform track and including a gate portion extendable into the track space;
    a driving mechanism configured to be operatively coupled to the gate member and configured to facilitate displacement of the displaceable platform; and
    a switch control configured to be operatively coupled to the driving mechanism and configured to be located in a cab of the truck to manually control activation of the driving mechanism from the cab.

2. The displaceable ball hitch assembly of claim 1, wherein the gate portion is configured to maintain the platform in a first primary position in the track space and configured to be movable from the track space to allow the platform to displace in a rearward direction to a second position within the track space.

3. The displaceable ball hitch assembly of claim 1, wherein the driving mechanism is configured to automatically displace the gate portion from the track space.

4. The displaceable ball hitch assembly of claim 2, wherein the first primary position provides that the ball hitch is located adjacent to and forward of an axis corresponding with a rear axle of the truck.

5. The displaceable ball hitch assembly of claim 2, wherein the second position provides that the ball hitch is located rearward of an axis corresponding with a rear axle of the truck.

6. The displaceable ball hitch assembly of claim 1, wherein the gate portion comprises a piston displaceable between a closed gate position and an open gate position, the piston being spring biased toward the closed gate position and the piston being displaceable to the open gate position via the driving mechanism.

7. The displaceable ball hitch assembly of claim 1, wherein the drive mechanism comprises an air supply configured to be operatively coupled to the gate member to facilitate pneumatic displacement of the gate portion to an open gate position to allow displacement of the platform.

8. The displaceable ball hitch assembly of claim 1, wherein the drive mechanism is configured to facilitate displacement of the gate portion hydraulically.

9. The displaceable ball hitch assembly of claim 1, wherein the drive mechanism is configured to facilitate displacement of the gate portion electrically.

10. The displaceable ball hitch assembly of claim 1, further comprising a main mounting plate configured to be mounted to the truck below the bed of the truck and coupled to the platform track.

* * * * *